United States Patent [19]

Brotz

[11] Patent Number: 5,269,982
[45] Date of Patent: Dec. 14, 1993

[54] PROCESS FOR MANUFACTURING A SHAPED PRODUCT

[76] Inventor: Gregory R. Brotz, P.O. Box 1322, Sheboygan, Wis. 53081

[21] Appl. No.: 834,386

[22] Filed: Feb. 12, 1992

[51] Int. Cl.⁵ .................... B29C 35/08; B29C 35/10
[52] U.S. Cl. ...................... 264/25; 264/37; 264/113; 264/126
[58] Field of Search ............ 264/25, 37, 113, 122, 264/126

[56] References Cited

U.S. PATENT DOCUMENTS

| | | | |
|---|---|---|---|
| 4,275,028 | 6/1981 | Cohen | 264/126 |
| 4,623,505 | 11/1986 | Traut | 264/126 |
| 4,636,547 | 1/1987 | Engelmann et al. | 524/523 |
| 4,758,404 | 7/1988 | Muto | 264/25 |
| 4,923,657 | 5/1990 | Gembinski et al. | 264/73 |
| 4,940,502 | 7/1990 | Marcus | 264/126 |
| 4,942,007 | 7/1990 | Kunimoto et al. | 264/122 |
| 5,085,812 | 2/1992 | Ahrweiler et al. | 264/37 |
| 5,156,697 | 10/1992 | Bourell et al. | 264/113 |

Primary Examiner—Mary Lynn Theisen
Attorney, Agent, or Firm—William Nitkin

[57] ABSTRACT

Process for creating a shaped product from a plurality of particles by having a heat beam directed thereon in a desired pattern, fusing the particles into a structure in the desired pattern where the heat beam was directed, such shaped product being removed from the remainder of the unfused particles, such process in some embodiments being a continuous process.

8 Claims, 4 Drawing Sheets

PROCESS FOR MANUFACTURING A SHAPED PRODUCT

BACKGROUND OF THE INVENTION

1. Field of the Invention

The process of this invention resides in the area of processes for producing a shaped product and more particularly relates to a process for producing a product by the fusing of particles to form a solid member in a desired shape.

2. Description of the Prior Art

Processes for producing molded products are well known such as the lost wax method, injection molding and the like. Sintering to form a coherent, non-porous bonded mass by heating metal powders without melting them is also well known.

SUMMARY OF THE INVENTION

It is an object of this invention to provide a new process for the shaping of materials that does not utilize tranitional molds as found in the prior art but creates the shape of the new structure by the direction of a heat beam, such as from a laser, onto a plurality of particles. The particles struck by the heat are heated and fused together while those not struck or affected by the heat beam are not so fused and remain separate from the fused particles. The fused particles solidify in the shape in which the heat beam has struck them and can be lifted away and removed from the remaining unfused particles, creating a structure in the desired shape.

In one embodiment of the process of this invention a container can be provided in which a plurality of particles are arrayed in a level plane contacting one another. The particles can be made of plastic in the shape of spheres, beads, shavings and the like. The particles can also be made of other materials which when heated sufficiently will fuse together. The particles held within the container can, in another embodiment, be floated en masse on a fluid medium. Means can be provided to add more particles into the container at the same time that some of the particles are fused together to form such shaped product and removed therefrom. A heat beam, such as produced by a laser, can be directed in a desired pattern onto the particles, and where the heat beam strikes the contacting particles, they fuse together. When the beam passes away from the fused particles, the fused particles solidify to form a solid structure which can be contiguous with the structure of other previously fused particles. As the solidified structure is removed from the particle bed by pulling the adjacent newly fused and solidified particles therefrom, patterns of movement of the heat beam can continuously create a shaped product.

DESCRIPTION OF THE PREFERRED EMBODIMENT(S)

Figures 1, 1A:
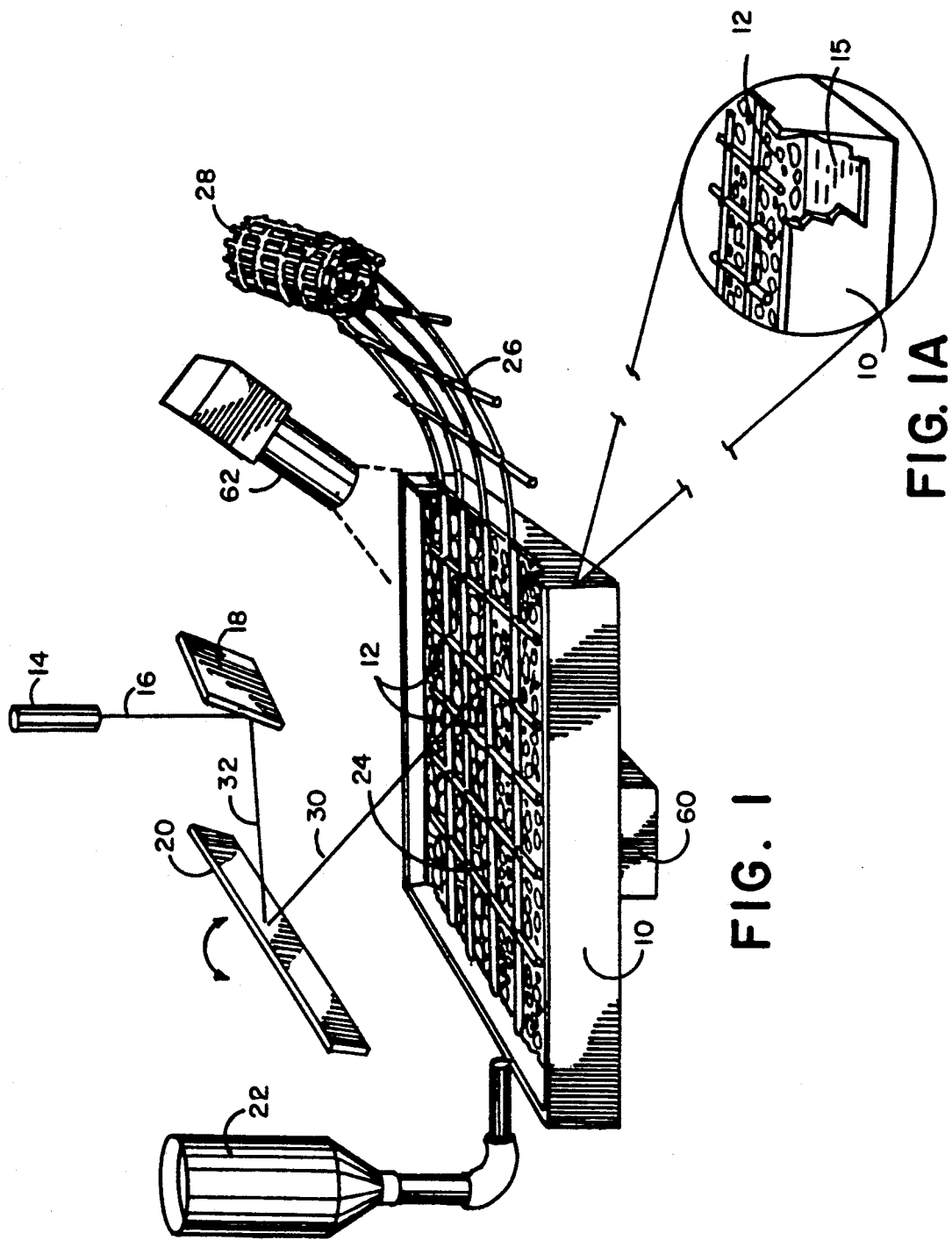
FIG. 1 illustrates a perspective view of the components of the system utilizing the process of this invention to produce a shaped product.
FIG. 1a illustrates an alternate embodiment of a section of a container bed holding particles for use in the process of this invention.
Figure 6:
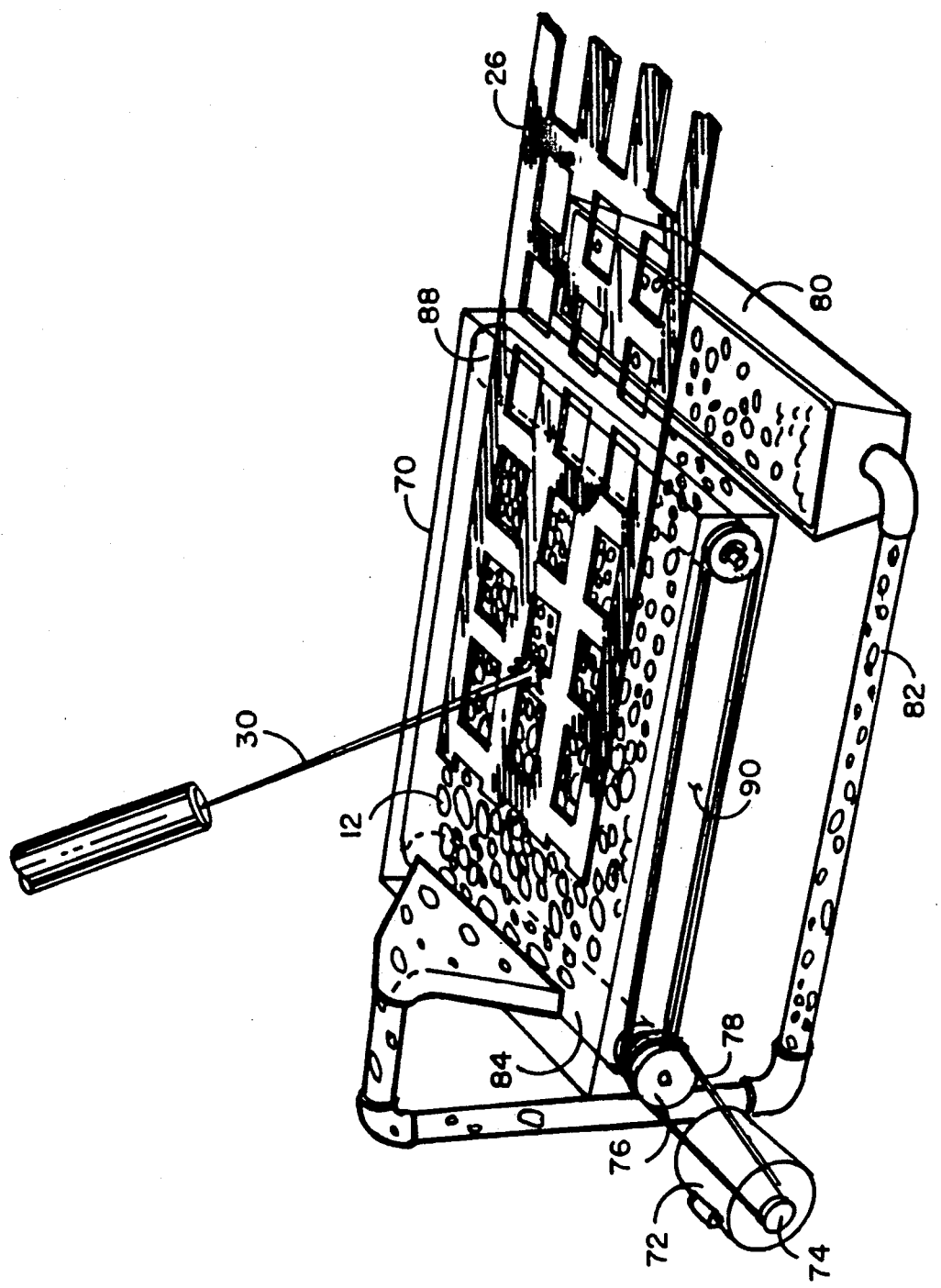
FIG. 6 illustrates a conveyor belt moving the particle bed.

FIG. 1 illustrates the components utilized in the basic process of this invention wherein container 10 holds a plurality of particles 12 in a bed spread about with the top surface thereof generally in a level plane. A particle supply source 22 can provide further particles into container 10 automatically by gravity feed as particles 12 are removed during the structure-forming processes described below. Container 10 can be of a variety of shapes including irregular shapes. In an alternate embodiment the plurality of particles can be floated upon a fluid medium 15 as seen in FIG. 1a. Such fluid can be water, mercury or other equivalent fluid capable of supporting the particles. Care must be taken to choose a fluid which does not draw too much heat away from the particles which condition might affect their ability to melt or fuse. The liquid bed also should not be too volatile to avoid vaporizing or boiling the fluid which condition might adversely agitate the particles. The plurality of particles can also be arrayed and advanced on a conveyor belt to create a forward-moving bed as seen in FIG. 6.

In one embodiment of the process of this invention a heat beam source, such as laser 14, is provided with beam 16 being directed initially by first rotating mirror 18. Laser 14 can be a high-intensity, high-power laser such as a $CO_2$(carbon dioxide) gas laser or a NdYag (neodymium yttrium aluminum garnet) solid state laser. Mirror 18 rotates from side to side directing the first portion of beam 32 along the width of second mirror 20 which rotates up and down directing the beam onto particular particles in the container, scanning its top surface's length and width with a beam pattern. The mirrors direct the beam, which can be pulsed, to various points on the surface of the particles in a desired pattern. The pattern of the directed heat beam can be controlled by a computer. Other systems of beam direction can be utilized such as using the beam directly from the laser or bouncing the beam off only one mirror. The heat beam will heat the particles which it strikes, such as heated particles 24, which after sufficient heating, fuse together and later solidify after the beam passes into a structure having the shape of the pattern formed by the heat beam. A cooling blower 62 can be used to cool the structure which cooling accelerates the solidification of the cooling mass of fused particles. Also a vibrator 60 can be used to help spread the particles evenly within container 10. The solidified product, such as shaped fused product 26, can be then removed from container 10 by lifting or pulling it out of container 10 and in some cases coiling it into roll 28. If the particles are advancing on a belt, the fused particle structure when cooled can be removed when it reaches the end of the belt. In the example illustrated the product can be used for a variety of uses such as fencing, production of artwork and the like. While the shaped product is pulled out of the front of container 10, further continuous fusing occurs at the rear of container 10 nearer second rotating mirror 20 which would be projecting the heat beam onto the particles in a designated pattern so that the shaped structure can be removed by pulling, with new particles being fed into the container from particle supply source 22, so as to support a continuous process. Different heat beam patterns can be utilized to form other desired shaped structures. As long as the structure of the fused product is contiguous with newer portions, the structure can be continuously pulled from the particle bed.

In some cases a single, discrete shaped product can be produced which is neither contiguous or rolled. Other methods of directing the heat beam can also be utilized.

Figure 2:
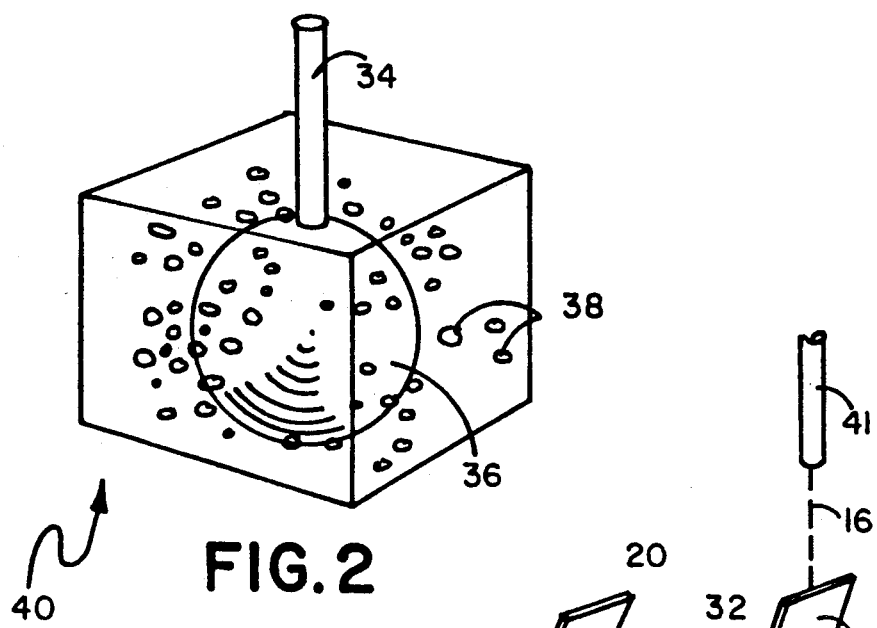
FIG. 2 illustrates a retention member held within a container of particles for attraction of particles thereto.

In FIG. 2 a different structure is used to produce a shaped product from a plurality of particles, being central retention member 36 which, in the example illustrated, is in the shape of a sphere mounted on support post 34 which post can be attached to a high voltage source. The high voltage source creates a static electrical charge and attracts particles 38 within container 40 to be retained upon central retention member 36. While in the example illustrated in FIG. 2 central retention member 36 is circular, it could be of any desired shape. Central retention member 36 can also be of the collapsible core type for ease of product removal. Further a glue can be used to adhere particles to retention member 36 which in some embodiments can be made of a high-temperature material that has a low co-efficient of friction such as Silverstone a brand name of a heat-resistant, non-stick coating or soapstone.

Figure 3:
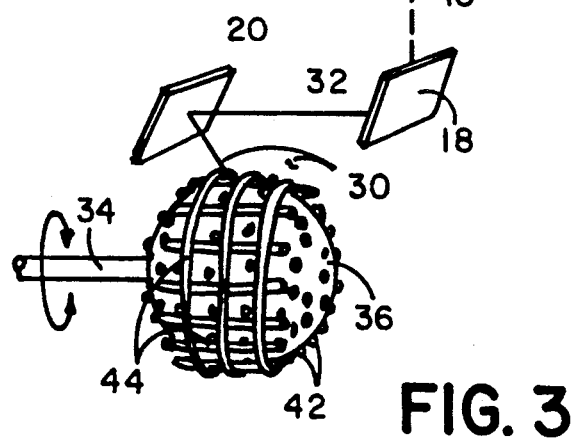
FIG. 3 illustrates the formation of a shaped structure by the direction of a heat beam onto particles attracted by static electricity to a retention member.
Figure 4:
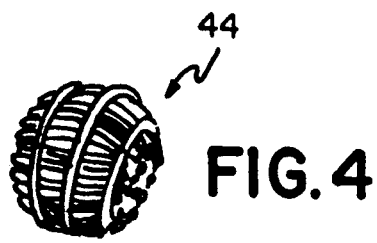
FIG. 4 illustrates the shaped product removed from a retention member.

FIG. 3 shows a process involving a directed heat beam similar to that illustrated in FIG. 1 where laser 41 directs its heat beam 16 against first mirror 18 which rotates back and forth directing heat beam 32 to second mirror 20 which directs that beam up and down over central retention member 36 which is then covered with particles 42 adhered thereto by static electricity. Support post 34 and attached retention member 36 can be rotated as the beam is directed thereon, and a shape can be formed by directing the mirror system and pulsing the laser in a desired sequence such that particles 42 fuse to form a continuous structure having, for example, a grid-like pattern. This product, when solidified, can be removed from the central retention member physically by stretching, sliding or other means depending upon the shape of the retention member. The remaining unaffected particles can be returned to container 40, as seen in FIG. 2, leaving a shaped product 44, as seen in FIG. 4. Such shaped products can be used for a variety of purposes.

Figure 5:
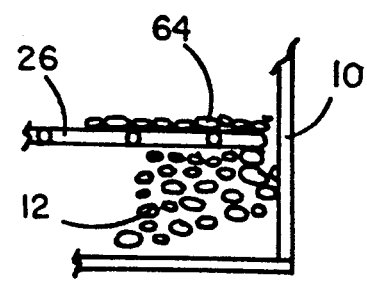
FIG. 5 illustrates a front cross-sectional view of an embodiment where the solidified product is covered with particles of a different type from those in the particle bed.

FIG. 5 illustrates a partial front cross-sectional view through container 10 showing fused product 26 being covered by secondary particles 64 which, in some embodiments, can be of a different material from the original particles 12 and which can be fused by heat beam 30 onto the already fused particles of different composition making up the original fused product 26.

FIG. 6 illustrates the formation of fused product 26 from a bed of particles 12 moving on conveyor belt 90. Conveyor belt 90 is moved around first and second rollers 84 and 88, respectively, advancing particles 12 as they are heated by beam 30 and fused. When conveyor belt 90 goes around roller 88, it goes back on the bottom to first roller 84. Particles 12 fall off the front end of conveyor belt 90 at second roller 88 into trough 80 where they are moved by auger pipe 82 back to the beginning of the belt travel above first roller 84. First roller 84 and conveyor belt 90 can be driven by motor 72 to drive pulley 74 which moves belt 78 to drive pulley 76.

Figure 7:
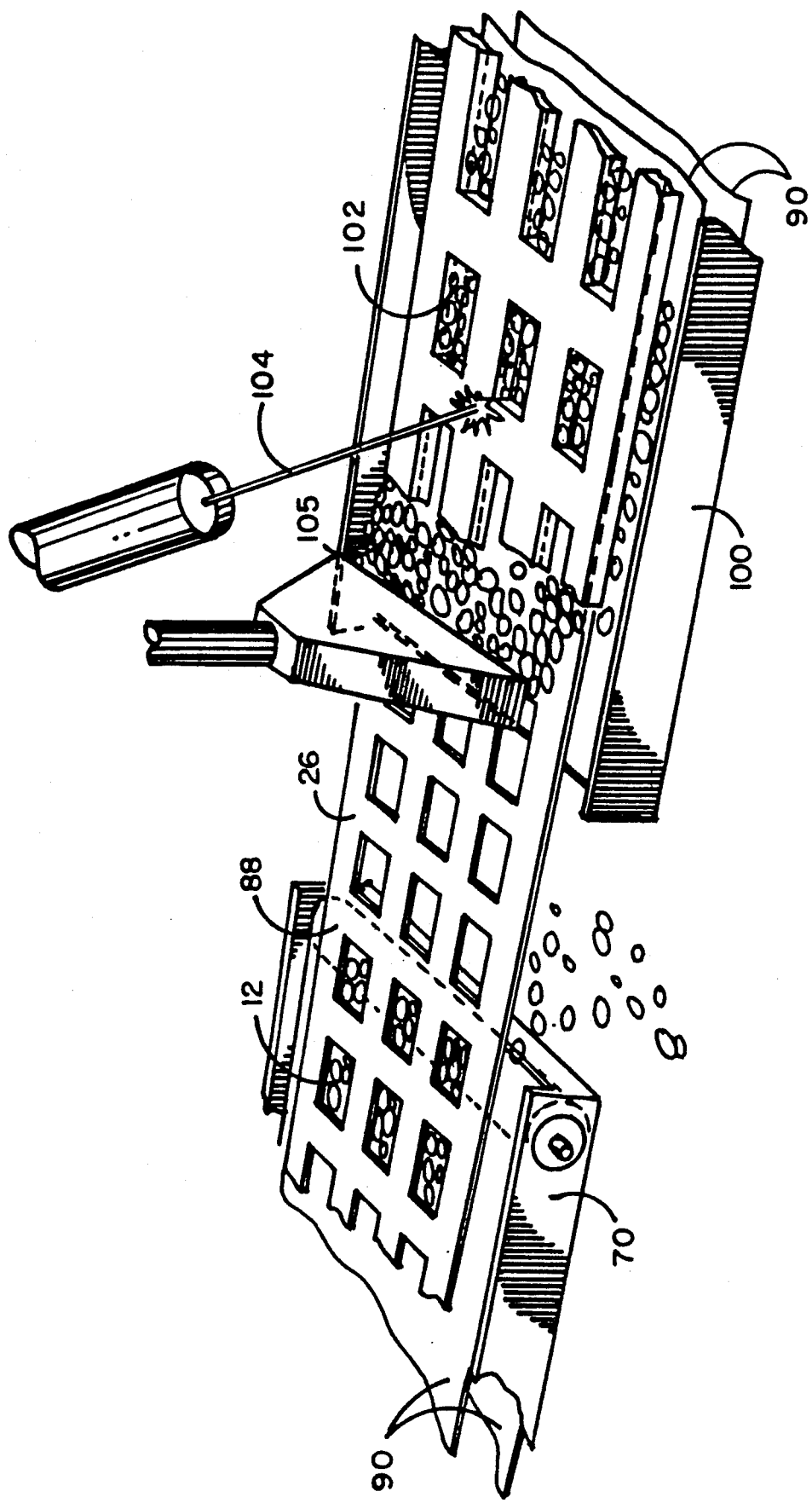
FIG. 7 illustrates dual containers with two particle beds.

FIG. 7 illustrates container 70 with conveyor belt 90, showing fused product 26 passing to a second container 100 where fused product 26 is covered by more particles 105 which can be of a different composition and/or color to that of particles 12 and which particles 105 are fused onto fused product 26 by moving heat beam 104. Particles 102 in container 100 can also be of a different composition from the particles in the first container. Fused product 26 in container 100 can also be advanced by conveyor belt 90 partially seen in FIG. 7. The scanning pattern of the heat beam can be moved to create a fused product at the same rate that the fused product is removed from the container with the scanning pattern taking place at the opposite end of the container from the end at which the fused product is removed.

The data from the computer that directs the heat beam can come from a program from a video camera which scans images using edge enhancement technique so that a heat beam conforming to the edges of an image is directed to form a similar shape in the particle bed to that toward which the video camera is directed.

Although the present invention has been described with reference to particular embodiments, it will be apparent to those skilled in the art that variations and modifications can be substituted therefor without departing from the principles and spirit of the invention.

I claim:

1. A process for producing a shaped product characterized by being free-standing and not supported on a substrate comprising the steps of:
   providing a plurality of fusable particles each in contact with its immediately adjacent particles in a particle bed;
   directing a heat beam in a pattern onto said particles to fuse certain of said particles together and to allow those particles to solidify into a desired shape; and
   removing said solidified structure formed in said desired shape from said particle bed.

2. The process of claim 1 further including the steps of:
   providing said heat beam from a laser;
   rotating a first mirror back and forth, reflecting said heat beam;
   rotating a second mirror up and down, receiving the reflected beam from said first mirror and directing it to said particles;
   fusing said particles where struck by said heat beam, such particles when said heat beam passes thereby, solidifying and forming a structure where struck; and
   lifting and removing said solidified structure out from said plurality of particles while at the same time directing said heat beam to contiguous particles to create a continuous shaped structure as it is removed from the particles.

3. A process for producing a shaped product comprising the steps of:
   providing a plurality of fusable particles each in contact with its immediately adjacent particles in a particle bed;
   floating said plurality of particles on a fluid medium;
   directing a heat beam in a pattern onto said particles to fuse certain of said particles together and to allow those particles to solidify into a desired shape; and removing said solidified structure formed in said desired shape from said particle bed.

4. The process of claim 3 further including the step of:

continuously removing said fused and solidified particle structure from said particle bed while heating and fusing particles contiguous with said solidified particles.

5. The process of claim 4 further including the step of:

adding particles continuously to said particle bed as said fused and solidified particles are being removed therefrom.

6. A process for producing a shaped product comprising the steps of:

providing a retention member in a desired shape;

providing a plurality of fusable particles each in contact with its immediately adjacent particles in a particle bed;

adhering said plurality of particles to said retention member by applying a static electrical charge to said retention member causing said particles to be attracted to and adhere to said retention member;

directing a heat beam in a pattern onto said particles to fuse certain of said particles together and to allow those particles to solidify into a desired shape; and removing said solidified structure formed in said desired shape from said retention member.

7. A process for producing a shaped produt comprising the steps of:

providing a plurality of fusable particles each in contact with its immediately adjacent particles in a particle bed;

providing a retention member;

providing means to adhere said particles in contacting relationship with its immediately adjacent particles on said retention member;

directing a heat beam against selected of said adhered particles in a desired pattern to fuse said particles together in the areas where struck by said heat beam;

rotating said retention member under said heat beam;

creating a shaped product from said fused particles; and removing said shaped product from said retention member.

8. A process for producing a shaped product comprising the steps of:

providing a plurality of fusable particles each in contact with its immediately adjacent particles in a particle bed;

directing a heat beam in a pattern onto said particles to fuse certain of said particles together and to allow those particles to solidify into a desired shape;

continuously removing said fused and solidified particle structure from said particle bed while heating and fusing particles contiguous with said solidified particles;

advancing said bed of particles on a conveyor belt; and recycling unused particles back to the front of said conveyor belt.

* * * * *